United States Patent
Bailey et al.

(10) Patent No.: US 7,528,181 B2
(45) Date of Patent: May 5, 2009

(54) RUBBER COMPOSITION AND TIRE COMPRISING SAME

(75) Inventors: Rodney Bailey, Simpsonville, SC (US); Peter Hetzel, Greer, SC (US)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 173 days.

(21) Appl. No.: 11/487,864

(22) Filed: Jul. 17, 2006

(65) Prior Publication Data

US 2006/0258779 A1   Nov. 16, 2006

(51) Int. Cl.
- C08K 3/06 (2006.01)
- C08K 3/30 (2006.01)
- C08K 9/00 (2006.01)

(52) U.S. Cl. ...................... 523/205; 524/418
(58) Field of Classification Search ................ 523/205; 524/418

See application file for complete search history.

(56) References Cited

U.S. PATENT DOCUMENTS

| | | | |
|---|---|---|---|
| 2,623,079 A | 12/1952 | Johnson | |
| 5,743,973 A * | 4/1998 | Krishnan et al. | ......... 152/152.1 |
| 2003/0165682 A1 | 9/2003 | Menting et al. | |

OTHER PUBLICATIONS

International Search Report with Written Opinion of the International Searching Authority, mailed Jul, 30, 2004 for PCT/US2004/010809 filed Apr. 8, 2004.

* cited by examiner

Primary Examiner—Kriellion A Sanders
(74) Attorney, Agent, or Firm—Frank J. Campigotto; E. Martin Remick; Carolyn G. Uldrick (57) ABSTRACT

The present invention is a rubber composition comprising microencapsulated sulfur and free sulfur. The composition is particularly useful as a cushion gum in retreading procedures. In one embodiment of the invention, the composition further comprises one or more ultra-accelerator curing agents for rubber. In another embodiment of the invention, the rubber composition has a $t_{90}$ within twenty percent, more preferably within ten percent, and more preferably within five percent of the unaged green rubber composition, after 28 days aging at forty degrees Celsius. In another embodiment of the invention, the rubber composition has a $t_0$ within twenty percent, more preferably within ten percent, and more preferably within five percent of the unaged green rubber composition, after 28 days aging at forty degrees Celsius. In another embodiment of the invention, approximately between forty and fifteen percent, more preferably between thirty and twenty percent, and more preferably approximately twenty-five percent by weight of the sulfur in the composition is encapsulated.

Another embodiment of the invention is a tire comprising the rubber composition of the invention. Another embodiment of the invention is a recapped or repaired tire comprising the rubber composition of the invention. A further embodiment of the invention is a method of retreading a tire comprising application of the rubber composition of the invention between the tire tread and the carcass of a tire. A further embodiment of the invention comprises a method of repairing a tire comprising application of the rubber composition of the invention to a defect in the tire. A further embodiment comprises repair of rubber articles using the composition.

20 Claims, 5 Drawing Sheets

RUBBER COMPOSITION AND TIRE COMPRISING SAME

FIELD OF THE INVENTION

The present invention is in the field of elastomeric compositions, more particularly in the field of fast-curing rubber compositions for use in rubber articles, such as tires, belts, hoses, and tracks.

BACKGROUND OF THE INVENTION

The market for retreaded pneumatic tires is almost entirely in the arena of trucking, aircraft, and earthmoving vehicles. In the trucking market, the carcass of a tire is expected to last several hundred thousand miles, and be amenable to having a new tread adhered to it several times. New truck tires are quite expensive, and are therefore bought with the expectation that their high initial costs are offset by the long service life of the carcass, and the low comparative cost of retreading.

A variety of procedures and different types of equipment are available for use in recapping or retreading pneumatic tires. One of the first steps in retreading a worn tire is to remove remaining tread material from the tire carcass, for example, by a sanding procedure known as buffing. Next a layer of green (uncured) rubber, known as "cushion gum," is applied to the carcass. This layer of extruded uncured rubber may be stitched or adhesively bonded to the carcass. Next, a tread layer is applied atop the layer of cushion gum. In the cold recapping process, the tread is cured rubber, and has a tread pattern already impressed in its outer surface. The tire is then placed in an autoclave, and heated under pressure for an appropriate time to induce curing of the gum layer, and binding of the gum layer to the tread and the carcass. In the hot recapping process, the tread is uncured rubber, and has no tread pattern. The tire is then placed in a tire mold and heated under pressure for an appropriate time to cure the gum layer and the tread, and to cause the gum layer to bind with the tread and the carcass. [The term "cure" refers to the formation of cross-links between the elastomer molecules in the rubber compound, otherwise known as vulcanization].

However, in recapping procedures it is often necessary to employ rubber compounds with short vulcanization times. A high cure rate necessitates the use of ultra-accelerators in the rubber compound, which creates challenges for the employment of the compound. The accelerators, at ambient temperature, may begin to react with other components of the compound. They must therefore be stored under refrigeration to prevent premature curing of the compound or evolution of the cure rate. More importantly, the cure rate (also referred to as "cure law") may increase upon green aging of the compound, leading to the need for a process modification or possibly hindering performance of the product.

Various methods have been proposed to prevent premature curing of the cushion rubber compound. These include Japanese Patent No. 48052678 (1973); Japanese Patent No. 48052679 (1973); German Patent Application No. DE19754341 (1999); International Patent No. WO99/27012 (1999); European Patent Application No. EP1034216 (2000); Japanese Patent No. 59022942 (1984); Japanese Patent No. 52069455 (1977). Certain other references have addressed encapsulation of materials: U.S. Pat. No. 4,092,285 (1978); U.S. Pat. No. 6,058,994 (2000); U.S. Pat. No. 4,461,854 (1984). None of these methods has proven entirely satisfactory.

Therefore, it would be beneficial to have a rubber composition which did not require refrigeration, and which limited its cure rate change through its useful life, or, better still, which showed no cure rate change through its useful life.

SUMMARY OF THE INVENTION

The present invention is a rubber composition comprising microencapsulated sulfur and free sulfur. The composition is particularly useful as a cushion gum in retreading procedures. In one embodiment of the invention, the composition further comprises one or more ultra-accelerator curing agents for rubber. In another embodiment of the invention, the rubber composition has a $t_{90}$ (time for completion of 90% of the cure as measured by torque as shown by a rheometer curve) within twenty percent, more preferably within ten percent, and more preferably within five percent of the unaged green rubber composition, after 28 days aging at forty degrees Celsius. (Note that $t_{90}$ may also be termed $tc_{90}$) In another embodiment of the invention, the rubber composition has a $t_0$ (time for onset of 0% of the cure as measured by torque) within twenty percent, more preferably within ten percent, and more preferably within five percent of the unaged green rubber composition, after 28 days aging at forty degrees Celsius. In another embodiment of the invention, approximately between forty and fifteen percent, more preferably between thirty and twenty percent, and more preferably approximately twenty-five percent by weight of the sulfur in the composition is encapsulated.

Another embodiment of the invention is a tire comprising the rubber composition of the invention. Another embodiment of the invention is a recapped or repaired tire comprising the rubber composition of the invention. A further embodiment of the invention is a method of retreading a tire comprising application of the rubber composition of the invention between the tire tread and the carcass of a tire. A further embodiment of the invention comprises a method of repairing a tire comprising application of the rubber composition of the invention to a defect in the tire. A further embodiment comprises repair of rubber articles using the composition.

DETAILED DESCRIPTION OF THE INVENTION

The present invention is a rubber composition comprising microencapsulated sulfur and free sulfur. The composition is particularly useful as a cushion gum in retreading procedures. In one embodiment of the invention, the composition further comprises one or more ultra-accelerator curing agents for rubber. In another embodiment of the invention, the rubber composition has a $t_{90}$ (time for completion of 90% of the cure as measured by torque as shown by a rheometer curve) within twenty percent, more preferably within ten percent, and more preferably within five percent of the unaged green rubber composition, after 28 days aging at forty degrees Celsius. (Note that $t_{90}$ may also be termed $tc_{90}$) In another embodiment of the invention, the rubber composition has a $t_0$ (time for onset of 0% of the cure as measured by torque) within twenty percent, more preferably within ten percent, and more preferably within five percent of the unaged green rubber composition, after 28 days aging at forty degrees Celsius. In another embodiment of the invention, approximately between forty and fifteen percent, more preferably between thirty and twenty percent, and more preferably approximately twenty-five percent by weight of the sulfur in the composition is encapsulated.

Another embodiment of the invention is a tire comprising the rubber composition of the invention. Another embodiment of the invention is a recapped or repaired tire comprising the rubber composition of the invention. A further embodiment of the invention is a method of retreading a tire comprising application of the rubber composition of the invention between the tire tread and the carcass of a tire. A further embodiment of the invention comprises a method of repairing a tire comprising application of the rubber composition of the invention to a defect in the tire. A further embodiment comprises repair of rubber articles using the composition.

The present invention permits storage of the rubber composition, particularly useful for retreading of tires, at ambient temperatures, obviating the need for refrigeration. Furthermore, said rubber mix can maintain the same cure rate through storage at ambient temperature, simplifying retreading operations.

The composition in accordance with the invention may further include the customary fillers and additives such as, for instance, carbon black, silica, silicic acid, zinc oxide, stearic acid, cobalt salts, resins, protective agents such as antioxidants, extender oils, tackifying agents, and various processing agents.

$t_{90}$ and $t_0$

ASTM D2084 and ISO 3417 describe how to measure cure times (time $t_0$ for the onset of cure, and time $t_{90}$ for 90% completion of cure) for rubber compounds using an oscillating rheometer. These standards are incorporated by reference.

In other embodiments of the invention, the $t_{90}$ would be within 1%, 2%, 5%, 10%, 15%, 20%, 25%, 30%, 35%, 40%, 45%, and 50% of the unaged green rubber composition.

In other embodiments of the invention, the $t_0$ would be within 1%, 2%, 5%, 10%, 15%, 20%, 25%, 30%, 35%, 40%, 45%, and 50% of the unaged green rubber composition.

Note that "within 5%" for instance, means that the difference between the new value and the original value is less than five percent of the original value.

The Aging Test

The curing curve is measured before aging according to specific conditions. The aging test is performed by placing an uncured sample of the rubber in a laboratory oven typically 40 degrees Celsius. The uncured compound is aged in these conditions for several days, zero to 28 days, then the curing curve is measured in the same condition as with the unaged sample, to determine the "green stability" of the compound.

1. The uncured mix was milled to a thickness comparable to the actual production thickness. The samples described herein were milled to a thickness of 5-9 mm on a laboratory mill (the mix temperature must remain below 70 degrees Celsius during processing).

2. Samples milled to the specified thickness were placed in a laboratory oven (held at a temperature of 40 degrees Celsius) for a period 0-4 weeks.

3. Samples were removed from the oven at weekly intervals for rheometer testing. The evolution the cure system was measured by comparing the $t_{90}$ (unaged) to the $t_{90}$ data obtained at 28 day intervals.

Rubber

"Diene" elastomer or rubber is understood to mean, in known manner, an elastomer resulting at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a) any homopolymer obtained by polymerization of a conjugated diene monomer having 4 to 12 carbon atoms;

(b) any copolymer obtained by copolymerization of one or more dienes conjugated together or with one or more vinyl aromatic compounds having 8 to 20 carbon atoms;

(c) a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Suitable conjugated dienes include 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalised with a coupling and/or starring or functionalising agent.

Polybutadienes are suitable, for example those having a content of 1,2-units of between 4% and 80%, or those having a cis-1,4 content of more than 80%, polyisoprenes, butadiene-styrene copolymers, and those having a styrene content of between 5% and 50% by weight, butadiene-isoprene copolymers, including those having an isoprene content of between 5% and 90% by weight, isoprene-styrene copolymers and those having a styrene content of between 5% and 50% by weight.

In summary the diene elastomer of the composition according to the invention may be selected from the group of highly unsaturated diene elastomers which consists of polybutadienes (BR), polyisoprenes (IR), natural rubber (NR), butadiene copolymers, isoprene copolymers and mixtures of these elastomers.

Such copolymers may also be selected from the group which consists of butadiene-styrene copolymers (SBR), butadiene-isoprene copolymers (BIR), isoprene-styrene copolymers (SIR) and isoprene-butadiene-styrene copolymers (SBIR).

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

Ultra-accelerators

Rubber compositions which are intended for use as cushion gum, and those used as repair mixes, must present rapid curing at low temperatures with high yields. Therefore, in addition to vulcanization accelerators, ultra-accelerators are added to the composition. One classification of accelerators is as follows:

| Type | Relative Vulcanization Time at 284° F. | Examples |
|---|---|---|
| Slow | 90-120 minutes | Aniline |
| Moderately fast | Circa 60 min | Diphenylguanidine Hexamethylene tetramine |
| Fast | Circa 30 min | Mercaptobenzothiazole Benzothiazyl disulfide |
| Ultra-accelerators | Several minutes | Thiurams Dithiocarbamates Xanthates |

H. L. Stephans in "The Compounding and Vulcanization of Rubber", Chapter 2, *Rubber Technology* $3^{rd}$ edition, edited by Maurice Morton, 1987, incorporated herein by reference.

Suitable vulcanization ultra-accelerators include thiurams, xanthates, dithiocarbamates, dithiophosphates, and combinations thereof. More specifically, these include, but are not limited to:

tetramethylthiuram monosulphide (TMTM), tetramethylthiuram disulphide, tetraethylthiuram disulfide (TETD), tetrabenzylthiuram disulfide (TBzTD)

zinc isopropyl xanthate (ZIX), sodium isopropyl xanthate (SIX), zinc butyl xanthate (ZBX), dibutyl xanthogen disulfide, diethyl xanthogenate, diisopropyl xanthogen disulfide, diisobutyl xanthogen disulfide, zinc-N-dimethyl-dithiocarbamate (ZDMC), zinc-N-diethyldithiocarbamate (ZDEC), zinc-N-dibutyl-dithiocarbamate (ZDBC), zinc-N-ethylphenyl-dithiocarbamate (ZEBC), zinc-N-pentamethylene dithiocarbamate (ZPMC), Piperidine pentamethylene dithiocarbamate (PPD), Sodium diethyl dithiocarbamate (SDC)

copper diisopropyl dithiophosphate, zinc-O-,O-di-n-butylphosphorodithioate

Other suitable accelerators may be used in the rubber composition, such as: thiazoles, sulphenamides, guanidines, thiourea derivatives, amine derivatives, and combinations thereof. These include, but are not limited to: benzothiazyl-2-cyclohexyl sulphenamide (CBS), benzothiazoyl-2-tert.-butyl sulphenamide (TBBS), 2-mercaptobenzothiazole (MBT), zinc or sodium salt of 2-mercaptobenzothiazole (ZMBT), benzothiazyl-2-sulphene morpholide (MBS), benzothiazyl-dicyclohexy-1 sulphenamide (DCBS), diphenyl guanidine (DPG), Triphenyl guanidine (TPG), diorthotolyl guanidine (DOTG), o-tolylbigaunide (OTBG), ethylene thiourea (ETU), diethylthiourea (DETU), diphenyl thiourea (DPTU), benzothiazole disulfide (MBTS), hexamethylene tetramine (HMT), ethylidene aniline (EA), and mixtures thereof.

A combination of primary, secondary, and tertiary accelerators may be used to obtain the desired cure rate.

Sulfur

The sulfur used is known variously as pulverized sulphur, rubber maker's sulphur, commercial sulphur. The specific sulfur employed in the examples was a commercially available sulfur. In certain embodiments of the invention, the sulfur is microencapsulated in the following amounts by weight: between approximately 1% to approximately 5%, between approximately 5% to approximately 10%, between approximately 10% to approximately 15%, between approximately 15% to approximately 20%, between approximately 20% to approximately 25%, approximately 25%, between approximately 25% to approximately 30%, between approximately 30% to approximately 35%, between approximately 35% to approximately 40%, between approximately 45% to approximately 50%, between approximately 50% to approximately 55%, between approximately 55% to approximately 60%, between approximately 50% to approximately 60%, between approximately 60% to approximately 65%, between approximately 65% to approximately 70%, between approximately 60% to approximately 70%, between approximately 70% to approximately 75%, between approximately 75% to approximately 80%, between approximately 70% to approximately 80%, between approximately 80% to approximately 85%, between approximately 85% to approximately 90%, between approximately 80% to approximately 90%, between approximately 90% to approximately 95%.

Encapsulation Agents

"Micro encapsulation means 'to enclose in microcapsules' (*The American Heritage® Dictionary of the English Language,* Fourth Edition). However, in broader industrial terms, the modern origin of 'micro encapsulation' lies in the food and pharmaceutical sectors. Micro encapsulated materials are common in the food and pharmaceutical industries, but in almost all cases the encapsulation is designed to last either for a specific period or until destroyed by a specific trigger (i.e., crushing, rubbing, dissolution, temperature). In these applications, individual particles are coated by the encapsulating agent, and indeed the simplest definition of 'micro encapsulation' is the encasing of small particles within a shell of impermeable material.

Microencapsulation is the envelopment of small, solid particles, liquid droplets, or gas bubbles with a coating, usually a continuous coating. Many terms are used to describe the contents of a microcapsule such as active agent, active core, core material, fill, internal phase, nucleus, and payload. The coating material used to form the outer surface of the microcapsule is called a coating membrane, shell, or wall. It may be an organic polymer hydrocolloid, sugar, wax, metal, or inorganic oxide. Microcapsules usually fall in the size range of between 1 and 2000 microns, although smaller and larger sizes are known. Curt Thies, in *Encyclopedia of Polymer Science and Engineering,* Vol. 9, ed. H. Mark [John Wiley & Sons, New York, 2d edition, 1987), incorporated herein by reference.

In one embodiment of the invention, a microencapsulation material is selected that has a thermal transition temperature between the processing temperature and the curing temperature of the rubber composition. Note that, in one embodiment of the invention, the thermal transition temperature refers to the glass transition temperature of the microencapsulating material. In another embodiment of the invention, a man of skill in the art might refer to the softening point of the material, the melting point of the material, or the VICAT softening temperature (see ASTM D 1525). In one embodiment of the invention, the processing temperature is less than or equal to about 70 degrees Celsius, and the curing temperature is greater than or equal to about 125 degrees Celsius.

For the temperature parameters of one embodiment of the invention (70 degrees Celsius to 125 degrees Celsius), waxes, paraffins, polyethylene (PE), ethylene-vinyl acetate copolymers, polyvinyl alcohols (PVA) and mixtures of these may be employed. Also suitable are polyacrylic acid and derivatives, polyethylene oxide, polymethylmethacrylate (PMMA), polyvinyl acetate, thermoplastic polymers.

The processing temperature, [calendering and extrusion] for the rubber compound used for recapping is typically less than 70° C. but can be in the range of 50-90° C. The curing temperature is typically 125° C. but can be in a range of 100-170° C. The polymeric matrix materials for the microcapsule are selected using the knowledge of the maximum processing temperature and the curing temperature. In one embodiment of the invention, the encapsulation material is selected on the basis of the glass transition temperature. In another embodiment of the invention, the VICAT softening temperature [ASTM D1525, temperature at which a standard indenter penetrates into the surface of the test specimen under load] is employed to give additional information. The glass transition temperature of the encapsulating polymer should be above the maximum processing temperature of the rubber composition but below the curing temperature. These material properties prevent the reaction of the active product (sulfur in this case) from occurring at temperatures below the curing temperature. See "Glass Transition Temperature of Polymers," Chapter VI in *Polymer Handbook* 4$^{th}$ edition, ed. by J. Brandrup, E. H. Imergut and E. A. Grulke (John Wiley & Sons, NY), incorporated herein by reference.

The glass transition temperatures of the polymers was measured using Differential Scanning Calorimetry. Heat flow calorimetry was performed using a Seiko Instruments Inc. (Austin, Tex.) Differential Scanning Calorimeter. The polymer samples were heated at a scanning rate of 20° C./min between 30 and 300° C., to allow the determination of the glass transition temperature (Tg). The Tg is indicated by a discontinuity in the heat capacity ($C_p$), curve. (see, e.g. http://www.psrc.usm.edu/macrog/dsc).

Some typical glass transitions temperatures for polymer are:

| Polymer | Glass Transition Tg (° C.) |
| --- | --- |
| Polystyrene | 90-100 |
| Polymethylmethacrylate (syndiotactic) | 115 |
| Poly bisphenol A carbonate | 150 |

In one embodiment of the invention, polymers which have a glass transition temperature between 70° C. and 125° C. may be employed as encapsulation agents. [Polymer Handbook 4$^{th}$ Edition (John Wiley & Sons, New York 2003); Mat Web (www.matweb.com)].

Suitable polymers include natural polymer, carbohydrates, polyacetals, polyesters, polybenzoxazoles, polypyrazoles, polyacrylics, polymethacrylics, polyalkenes, polystyrenes, polyvinyl alcohols, polyvinyl ketones, polyphenylenes and combinations thereof. More specifically, these include, but are not limited to: amylose tributyrate, cellulose, cellulose laurate, cellulose triacetate, gelatin, poly(1,3-dioxa-4,6-cyclohexylenemethylene), poly(acrylic acid), poly(2-methyl-1,3-dioxa-4,6-cyclohexylenemethylene), poly(benzoxazole), poly(4-biphenylyl acrylate), poly (tert-butyl acrylate), poly (acrylonitrile methacrylate), poly(2-hydroxypropyl methacrylate), poly(2-hydroxyethyl methacrylate), poly(isopropyl methacrylate) atactic, poly(isopropyl methacrylate) syndiotactic, poly(phenyl methacrylate), poly(3,3,5-trimethylcyclohexyl methacrylate), poly(cyclohexylethylene), poly[(cyclohexylmethyl)ethylene)], poly(2-chlorostyrene), poly(cyclopentylethylene), poly(ispropylethylene) isotactic, poly(3-chlorostyrene), poly(4-chlorostyrene), poly(2-ethylstyrene), poly(3-methylstyrene), poly(4-acetylstyrene), poly(4-benzoylstyrene), poly(5-tert-butyl-2-methylstyrene), poly(4-sec-butylstyrene), poly(2,4-dimethylstyrene), poly(3,4-dimethylstyrene), poly(3,5-dimethylstyrene), poly(4-ethoxylstyrene), poly(3-hydroxymethylstyrene), poly(4-tert-butylbenzoylethylene), poly(2,5-dimethyl-1,4-phenylene ethylene), poly(1,4-phenylene ethylene), polymethylmethacrylate (PMMA), polystyrene (PS), cellulose acetate propionate, cellulose acetate, polyamide 66 (Nylon), polyethylene terephthalate (PET), polyethylene terephthalate glycol (PETG), polycyclohexylene methylene terephthalate polyester (PCTG), polyphenylene sulfide (PPS). Suitable copolymers include, but are not limited to: acrylonitrile butadiene styrene (ABS), polycarbonate-polyethylene terephthalate (PC-PET), and polyvinyl chloride acrylic alloys. These polymers and copolymer include, but are not limited to, the following commercial polymers: Dow Styron 612, BASF Plystol 158K, Enichem Edistin N1461, Dow Magnum 213 ABS, Eastman Tenite Propionate 383A-08, Eastman Eastalloy DA107, Eastman Eastar GN101 and Eastman Eastar DN004.

Methods of Microencapsulation

Methods of microencapsulation are described in: Watts, P. J., Davies, M. C. and C. D. Melia, "Microencapsulation using Emulsification/Solvent Evaporation: An Overview of Techniques and Applications", Critical Reviews in *Therapeutic Drug Carrier Systems* Vol. 7, Issue 3 (1990), pp. 235-259; Herbig, J. A. and J. F. Hanny, "Process for Making Minute Capsules and Prefabricated System Useful Therein", U.S. Pat. No. 3,732,172; May 8, 1973; Legrand, J., Brujes, L., Garnelle, G., and P. Phalip, "Study of a microencapsulation process of a virucide agent by solvent evaporation technique", *J. Microencapsulation,* 1995, Vol. 12, No. 6, 639-649; Cleland, J. L., "Solvent Evaporation Process for the Production of Controlled Release Biodegradable Microsphere Formulations for Therapeutics and Vaccines", *Biotechnol. Prog.* 1998, vol. 14, pp. 102-107; Amsden, B., "The Production of Uniformly Sized Polymer Microspheres", *Pharmaceutical Research,* Vol. 16, No. 7, 1999, pp 1140-1143; Fong; Jones W., "Microspheres, prepared by solvent removal from an oil-in-water emulsion using carboxylic acid salt surfactant, e.g., sodium oleate as the emulsifier," U.S. Pat. No. 4,384, 975, May 24, 1983; Sato, T., Kanke, M., Shroeder, H. G., and P. P. Deluca, "Porous Biodegradable Microspheres for Controlled Drug Delivery. I. Assessment of Processing Conditions and Solvent Removal Techniques", *Pharmaceutical Research,* Vol. 5, No. 1, 1988, pp. 21-30; Jorda; Rafael, Autant P. and R. Rossin "Microcapsules containing at least one active ingredient, application of such capsules and one of their preparation methods", U.S. Pat. No. 5,585,050; Dec. 17, 1996; Rossling; Georg, Albayrak; C.; Tack; J. and Schmitz; R., "Method of producing morphologically uniform microcapsules and microcapsules produced by this Method", U.S. Pat. No. 6,294,204, Sep. 25, 2001; Sawaoka; R., Kouchi, S., and T. Muraki, "Microcapsule-type curing agent, method for producing the same, thermosetting resin composition, prepreg and fiber reinforced composite material" U.S. Pat. No. 5,726,222, Mar. 10, 1998, Assignee: Toray Industries, Inc. (JP); Tice, T. R. and D. H. Lewis, "Microencapsulation process", U.S. Pat. No. 4,389,330, Jun. 21, 1983; Thanoo, B. C., Sunny, M. C. and A. Jayakrishnan, "Oral Sustained-release Drug Delivery Systems using Polycarbonate Microspheres Capable of Floating on the Gastric Fluid", *J. Pharm. Pharmacol.* 1993, 45: 21-24; Tice, T. R. and R. M. Gilley, "Preparation of injectable controlled release microcapsules by solvent evaporation process," *J. Controlled Release* (2) 343, 1985; Teft, J. and D. R. Friend, "Polymeric Microspheres for Controlled-Release Herbicide Formulations," in *Polymer Delivery Systems,* El-Nokay M. A., Piatt, D. M. and Charpentier, B. A. eds. ACS Symposium Series No. 520; ACS: Washington, D.C. 1993; pp. 190-201; DeLuca, P. et al., "Biodegradable Polyester for Drug and Polypeptide Delivery, in *Polymer Delivery Systems,* El-Nokay M. A., Piatt, D. M. and Charpentier, B. A. eds.; ACS Symposium Series No. 520; ACS: Washington, D.C. 1993; pp. 53-79; Mathiowitz, E. and R. Langer, "Multiwall Polymeric Microcapsules", WO Patent 88/0830, Nov. 3, 1988; Pekarek, K. J., Jacob J. S. and E. Mathiowitz, "Double-walled Polymeric Microspheres for Controlled Drug Release", *Nature,* Vol. 367, pp. 258-260, Jan. 20, 1994, all incorporated herein by reference.

Particle sizes were measured using a Malvern Mastersize 2000, Malvern Instruments Ltd., Worcestershire, UK. In one embodiment of the invention, particles were generally less than 200 microns in diameter, and preferably less than 50 microns in diameter.

Fillers

Useful fillers include carbon black, and so-called white, or inorganic fillers. The white or inorganic filler used as reinforcing filler may constitute all or only part of the total reinforcing filler, in this latter case associated, for example, with carbon black.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tyre-grade carbon black filler in its reinforcement function.

The reinforcing inorganic filler may be a mineral filler of the siliceous or aluminous type, or a mixture of these two types of fillers.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible siliceous and/or aluminous fillers such as described above.

The reinforcing inorganic filler may also be used in a blend (mixture) with carbon black. Suitable carbon blacks are any carbon blacks, including the blacks of the type HAF, ISAF and SAF, which are conventionally used in tires, and particularly in treads for these tires. As non-limitative examples of such blacks, mention may be made of the blacks N115, N134, N234, N339, N347 and N375. The amount of carbon black present in the total reinforcing filler may vary within wide limits, this amount in one embodiment being less than the amount of reinforcing inorganic filler present in the rubber composition.

Preparation of the Rubber Compositions

The compositions are produced in suitable mixers, in a manner known to the person skilled in the art, typically using two successive preparation phases, a first phase of thermomechanical working at high temperature, followed by a second phase of mechanical working at lower temperature, as described, for example, in the applications EP-A-0 501 227, EP-A-0 810 258 or WO99/28376.

The first phase of thermomechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 180° C., is reached.

This first phase may itself comprise a single or several thermomechanical working stages, separated for example by one or more intermediate cooling stages. The various ingredients of the composition, elastomer(s), reinforcing filler and its coupling agent, and the various other components ("additives") may be incorporated in the mixer in one or more steps, either during the first thermomechanical stage, or staggered during the various thermomechanical stages, if applicable. The total duration of this thermomechanical working (typically between 1 and 20 minutes, for example between 2 and 10 minutes) is selected according to the specific operating conditions, in particular the maximum temperature selected, the nature and volume of the constituents, the important thing being that a good dispersion of the various ingredients which inter-react is obtained in the elastomeric matrix, thus permitting firstly good processing of the composition in the uncured state, then a sufficient level of reinforcement, after curing, by the reinforcing filler and its intermediate coupling agent.

After cooling of the mixture thus obtained, a second phase of mechanical working is then implemented, at a lower temperature. Sometimes referred to as "productive" phase, this finishing phase consists of incorporating by mixing the vulcanization (or cross-linking) system (sulphur and accelerator(s)), in a suitable device, for example an open mill. It is performed for an appropriate time (typically between 1 and 30 minutes, for example between 2 and 5 minutes) and at a sufficiently low temperature (typically less than 120° C., for example between 60° C. and 100° C.), in all cases lower than the vulcanization temperature of the mixture, so as to protect against premature vulcanization (scorching).

After the mixing steps, described briefly above, the final composition thus obtained can then calendered, for example in the form of a film or a sheet, in particular for characterization in the laboratory, or alternatively extruded, in order to form for example a rubber profiled element or a repair material.

It goes without saying that the invention relates to the rubber compositions previously described, both in the "uncured" state (i.e. before curing) and in the "cured" or vulcanized state (i.e., after cross-linking or vulcanization).

Of course, the compositions according to the invention may be used alone or in a blend with other rubber compositions which can be used for manufacturing tires.

Rubber Composition

Figure 1:
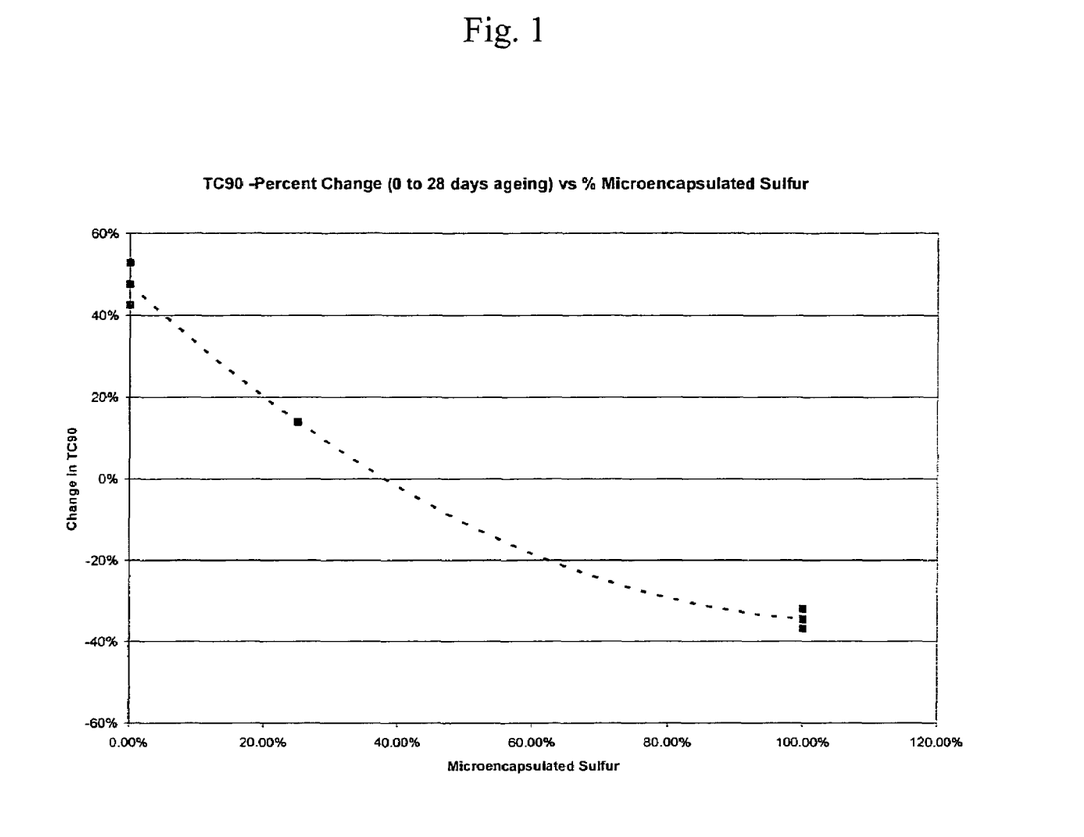
FIG. 1 shows the percent change in $t_{90}$ versus the percentage of microencapsulated sulfur in the composition.

In one embodiment of the invention, a typical rubber composition is made as follows:

0-100 phr dienic elastomer or mixture of dienic elastomers
0-60 phr filler
0-35 phr aromatic oils (including naphthenic and paraffinic oils)
0-4 phr antidegradant/antiozonant
0.5 to 3 parts stearic acid
0-3 phr primary, secondary or tertiary accelerator, or a mixture (from 5% to 90% of this microencapsulated)
0.2-3 phr ultra accelerator (from 5% to 90% of this microencapsulated)
0-4 phr sulfur (from 5% to 90% of this microencapsulated)
0-5 phr zinc oxide
0-5 phr tackifying resin Explanation of Figures FIG. 1 shows the percent change in $t_{90}$ after ageing for 28 days for compounds containing different percentages of microencapsulated sulfur versus free sulfur (that is, a certain percentage of the total amount of sulfur by weight was microencapsulated). The curve shows that the percent change in $t_{90}$ after ageing can be adjusted by varying the ratio of microencapsulated sulfur to free sulfur. Compounds with no microencapsulated sulfur exhibit an increase in the $t_{90}$ of greater than 40% when aged for 28 days. The $t_{90}$ for a compound containing 100% microencapsulated sulfur was shortened by approximately 30% when compared with the unaged compound. This curve establishes a relationship between the percent microencapsulated sulfur in the rubber compound and its ageing behavior as measured by $t_{90}$. Using this relationship, stable rubber compounds (i.e. compounds with a 0% change in $t_{90}$ during ageing) can be formulated. This curve shows that a compound containing approximately 40% microencapsulated sulfur and approximately 60% sulfur would be a stable compound and exhibit a 0% change in $t_{90}$ after aging for 28 days.

Figure 2:
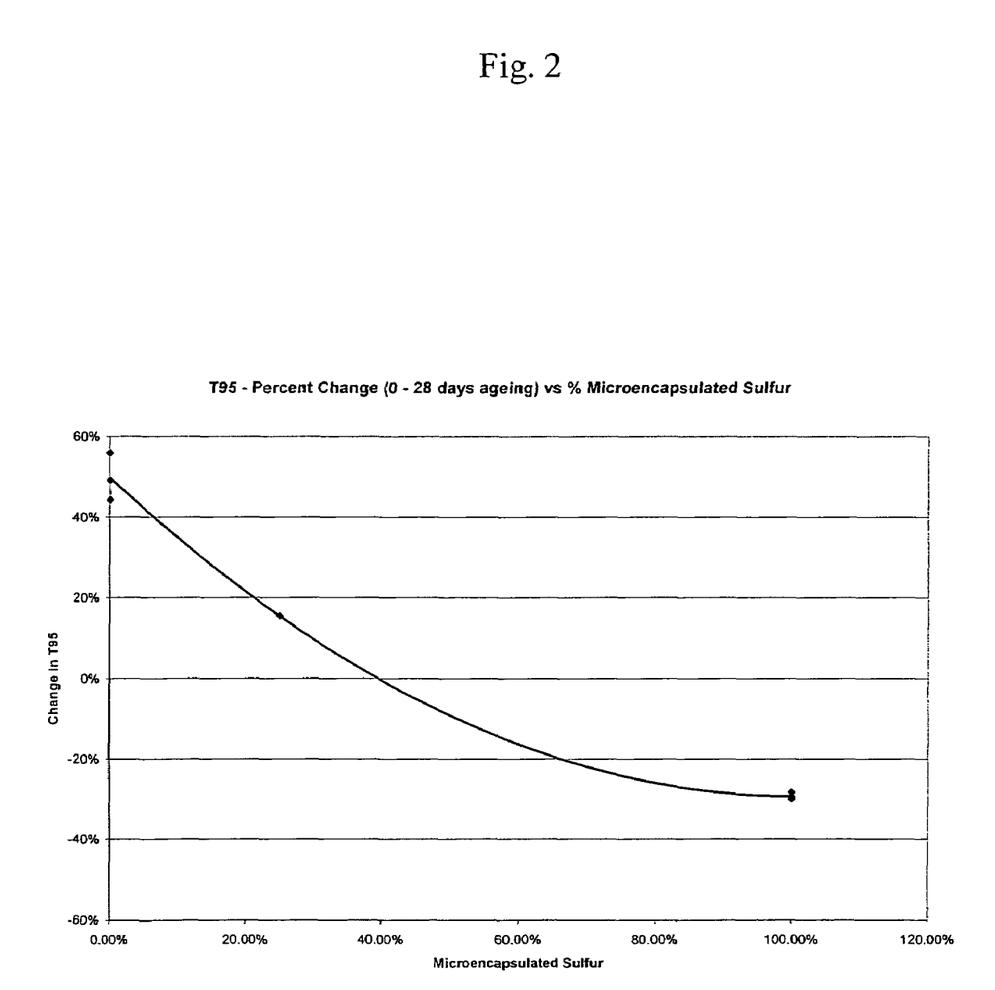
FIG. 2 shows the percent change in $t_{95}$ versus the percentage of microencapsulated sulfur in the composition.

FIG. 2 shows the relationship between the percent microencapsulated sulfur in the rubber compound and its aging behavior as measured by $t_{95}$. The curve shows that the percent change in $t_{95}$ after ageing can be adjusted by varying the ratio of microencapsulated sulfur to free sulfur. Compounds with no microencapsulated sulfur exhibit an increase in the $t_{95}$ of between 40 to 60% when aged for 28 days. The $t_{95}$ for a compound containing 100% microencapsulated sulfur was shortened by approximately 30% when compared with the unaged compound. Using this relationship, stable rubber compounds (i.e., compounds with a 0% change in $t_{95}$ during ageing) can be formulated. This curve shows that a compound containing approximately 40% microencapsulated sulfur and approximately 60% sulfur would be a stable compound and exhibit a 0% change in $t_{95}$ after aging for 28 days.

Figure 3:
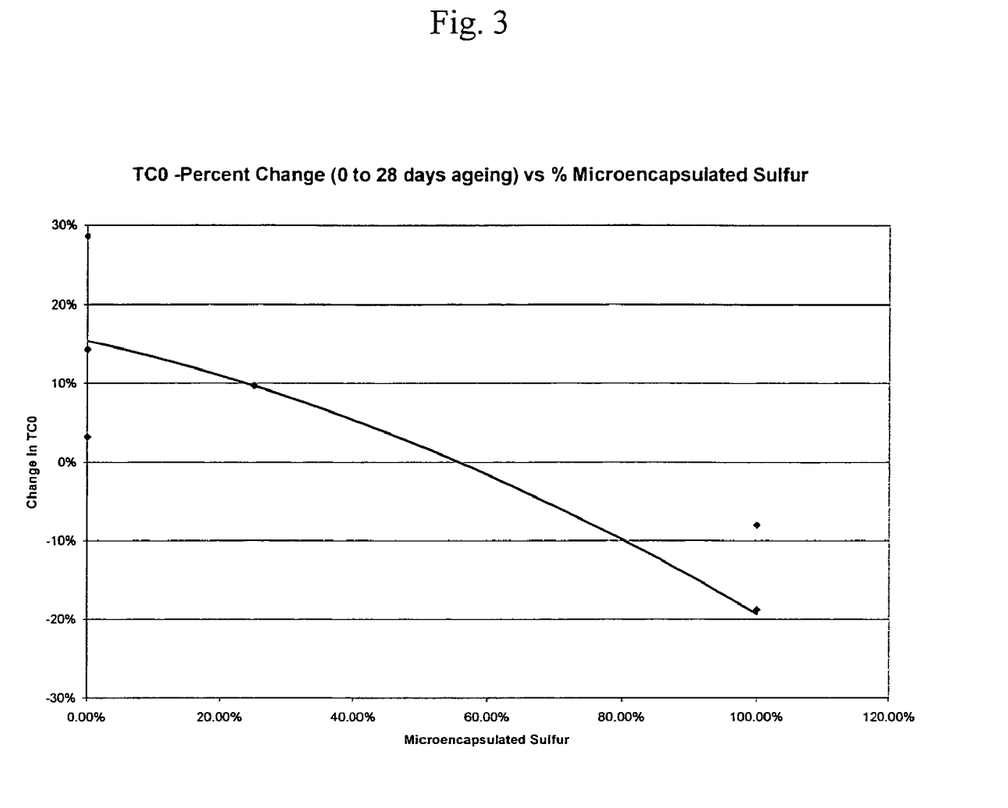
FIG. 3 shows percent change in $t_0$ versus the percentage of microencapsulated sulfur in the composition.

FIG. 3 shows the relationship between the percent microencapsulated sulfur in the rubber compound and its ageing behavior as measured by $t_0$. $t_0$ is the time for the initiation of the vulcanization. The curve shows that the percent change in $t_0$ after ageing can be adjusted by varying the ratio of microencapsulated sulfur to free sulfur. Compounds with no microencapsulated sulfur exhibit an average increase in the $t_0$ of between 10 to 20% when aged for 28 days. The $t_0$ for a compound containing 100% microencapsulated sulfur was shortened by between 10 to 20% when compared with the unaged compound. Using this relationship, stable rubber compounds (i.e., compounds with a 0% change in $t_0$ during ageing) can be formulated. This curve shows that a compound containing between 40 to 60% microencapsulated sulfur would be a stable compound and exhibit a 0% change in $t_0$ after ageing for 28 days.

Figure 4:
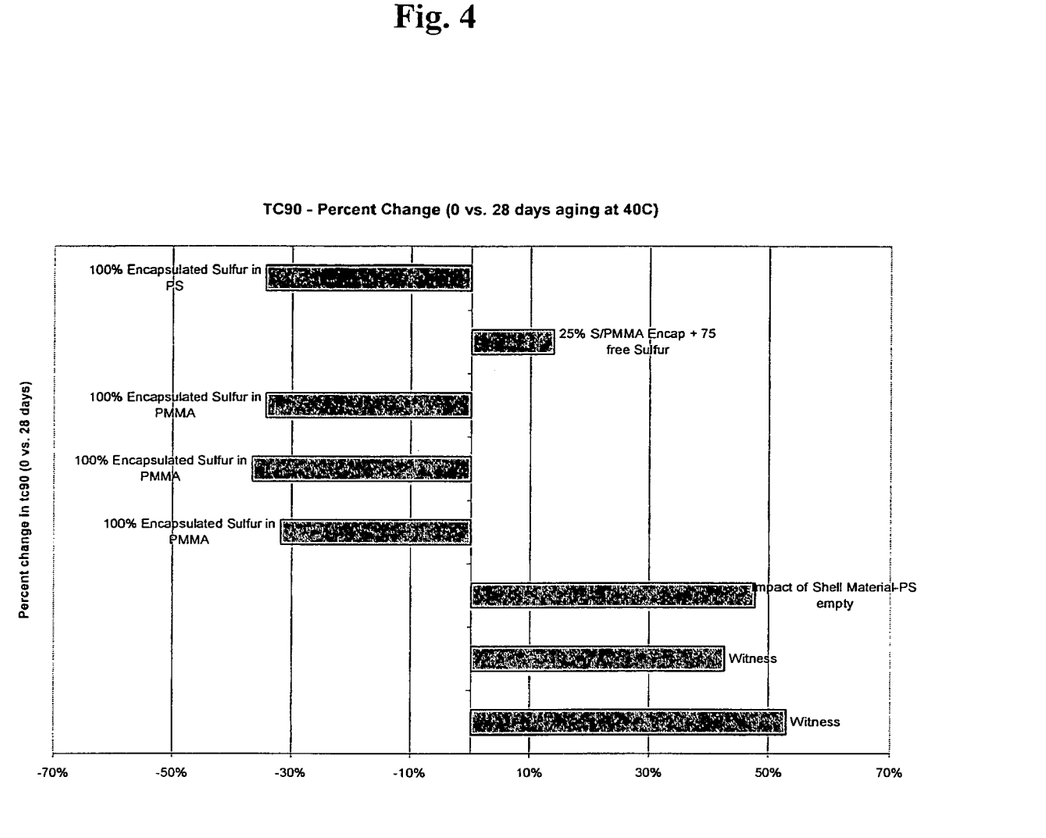
FIG. 4 shows the percent change in $tc_{90}$ for various rubber mixes.

FIG. 4 shows the percentage change in $t_{90}$ for different rubber compounds after ageing for 28 days. The rubber compounds are formulated with different percentages of microencapsulated sulfur and unencapsulated sulfur. The range for the microencapsulated sulfur is between 0 and 100%. The range for the unencapsulated sulfur is between 0 and 100%. The sulfur is microencapsulated in two different polymers, polystyrene or PMMA. The bar graph shows that the use of microencapsulated sulfur decreases the $t_{90}$ during aging of the rubber compound.

The invention will be further understood by reference to the following non-limiting examples.

EXAMPLES

Below are several examples which show the effect on $t_{90}$ after an accelerated aging test at 40° C. The examples represent different compositions which are the subject of this invention. Particle sizes were measured using a Malvern Mastersize 2000, Malvern Instruments Ltd., Worcestershire, UK.

A standard (witness) rubber mix was prepared as follows:
(a) 100 parts by weight per hundred parts (phr) rubber;
(b) 40-60 phr carbon black;
(c) 0-30 phr oil;
(d) 2-5 parts zinc oxide;
(e) 1-3 part stearic acid;
(f) 1-3 parts anti-oxidant
(g) 1-3 phr sulfur
(h) 1-5 phr ultra accelerator and accelerators

| Example | Description | Relative $t_{90}$* (Aged 28 days @ 40° C.) |
|---|---|---|
| 1 | Compound without encapsulation | 153 |
| 2 | Compound with 25% S/PMMA Microcapsules + 75% Sulfur | 114 |
| 3 | Compound with S/PMMA Microcapsules | 63 |
| 4 | Compound with S/PS | 81 |
| 5 | Compound with empty PS microcapsules | 148 |
| 6 | Compound with 25% S/PMMA Microcapsules + 75% Sulfur | 114 |

[*The baseline is 100, that is, no change in $t_{90}$ with time. The standard compound gives 153 which means the $t_{90}$ increased 53% during the 28 days of aging.]
Legend:
S—Sulfur;
PMMA—polymethylmethacrylate;
PS—polystyrene Example 1

Figure 5:
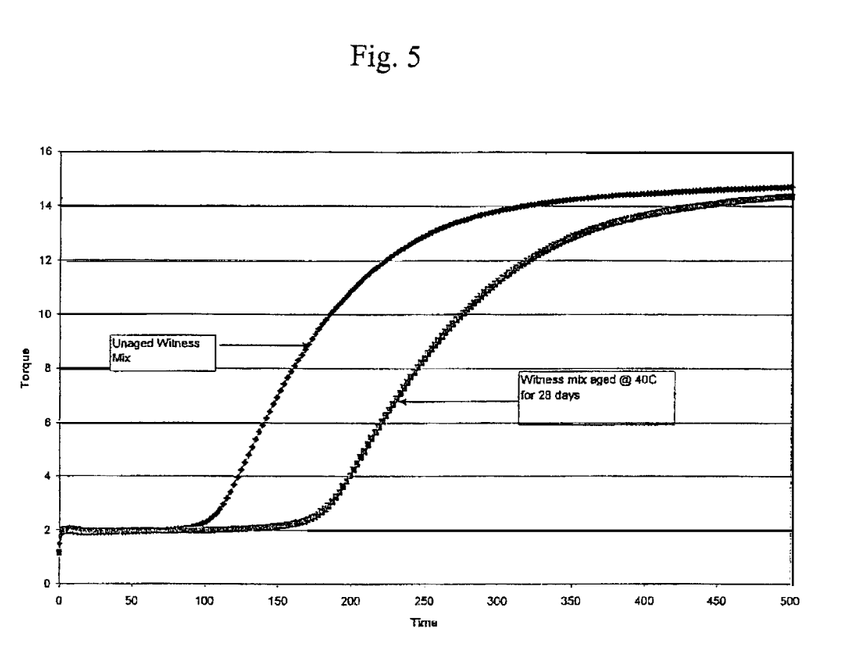
FIG. 5 shows how a rheometer curve changes for a rubber composition without encapsulation during aging.

This is the rubber compound without encapsulation which shows that on aging for 28 days at 40° C. the cure time, as measured by $t_{90}$, increased 53%. FIG. 5 shows how the rheometer curve (moving die rheometer @125°C.) changes during aging.

Example 2

Sulfur/polymethylmethacrylate microcapsules were prepared using a single emulsion evaporation microencapsulation technique. The microcapsules contained 18.7% sulfur. Differential scanning calorimetry (DSC) showed the microcapsules underwent a thermal transition at 115-122° C. Particle size anlaysis showed the capsules to have 90% of the particle in a size less than 4 microns, D90=4μ. Scanning electron microscopy showed the microcapsules to be spherical.

A rubber compound was made which contained the same quantity of sulfur as the standard compound, however 25% of the sulfur was microencapsulated sulfur (S/PMMA) and 75% was free sulfur. Aging of this compound for 2 weeks at 40° C. showed that $t_{90}$ increased by 14% as compared to the current compound in Example 1 which increased by 53%.

Example 3

Sulfur/polymethylmethacrylate microcapsules were prepared using a single emulsion evaporation microencapsulation procedure. The microcapsules contained 30% sulfur. Particle size as described by D90 was 30μ.

A rubber compound was made which contained the same quantity of sulfur as the standard compound, however 100% of the sulfur was microencapsulated sulfur (S/PMMA). Aging of this compound for 2 weeks at 40° C. showed a decrease in cure time. The $t_{90}$ decreased by 37% as compared to compound in Example 1 which increased by 53%.

Example 4

Sulfur/polystyrene microcapsules were prepared using a single emulsion evaporation microencapsulation procedure. The microcapsules contained 21.9% sulfur. A rubber compound was made which contained the same quantity of sulfur as the standard compound, however 100% of the sulfur was microencapsulated sulfur (S/PS). Aging of this compound for 2 weeks at 40° C. showed that cure time decreased. $t_{90}$ decreased by 19% as compared to current compound in Example 1 which increased by 53%.

This example illustrates that other polymers that have the correct thermal properties to allow the thermal release and reaction of the active product at temperatures near the rubber curing temperature can be employed as microcapsule shell material.

Example 5

Polystyrene microcapsules were prepared using a single emulsion evaporation microencapsulation procedure. These microcapsules did not contain any active vulcanizing agent.

A rubber compound was made which contained the same quantity of sulfur as the standard compound, however the empty polystyrene microcapsule were added at a quantity of 3.5 weight percent of the rubber compound. Aging of this compound for 2 weeks at 40° C. showed that cure time increased. $t_{90}$ increased by 48% as compared to current compound in Example 1 which increased by 53%.

This example illustrates that microcapsules which do not contain any active vulcanizing product has a negligible effect on the stability and cure rate of the compound.

The results in this example can be compared with the results described in Example 6 using sulfur/polystyrene microcapsules. After aging the $t_{90}$ decreased by 19% for the compound containing the S/PS microcapsules of Example 6 as compared to an increase in $t_{90}$ 48% for the compound in this example which contained empty polystyrene microcapsules.

Example 6

A rubber compound was made which contained the same quantity of sulfur as the standard compound, however 25% of the sulfur was microencapsulated sulfur (S/PMMA) and 75% was free sulfur. (This experiment repeats the procedure of Example 2). The curing behavior of the compound was measured immediately after rubber mixing. This compound showed a $t_{90}$ of 4.5 minutes as compared to a $t_{90}$ of 4.54 minutes for the standard which did not contain microencapsulated sulfur. Aging of this compound for 2 weeks at 40° C. showed that $t_{90}$ increased to 5.13 minutes as compared to current compound in Example 1 which had an increase in $t_{90}$ to 6.94 minutes.

This example illustrates that a rubber compound containing microencapsulated sulfur can be formulated to have the same initial curing behavior as the standard compound but the use of the microencapsulated sulfur improves the stability of the uncured compound during aging.

Other modifications and variations of the present invention will be apparent to those skilled in the art upon reading the present specification and these are intended to be within the spirit of the invention and the scope of the claims.

We claim:

1. An uncured dienic rubber composition, comprising:
   a dienic rubber;
   one or more ultra-accelerator rubber curing agents; and
   microencapsulated sulfur and free sulfur, the microencapsulated sulfur being microencapsulated in a material having a thermal transition temperature between a processing temperature and a curin temperature of the rubber composition, wherein a difference between $t_0$ measurements taken isothermally at 125° C. in accordance with ASTM D2084 of a 6 mm thick sample of the rubber composition aged for 28 days at 40° C. and of the rubber composition unaged, is less than a +10 percent change in the $t_0$ measurement of the unaged rubber composition, wherein the percent change is determined by the equation to $[t_{0\ (aged)} - t_{0\ (unaged)}] * 100 / t_{0\ (unaged)}$.

2. The rubber composition of claim 1, wherein the thermal transition temperature is between about 50° C. and 170° C.

3. The rubber composition of claim 1, wherein the thermal transition temperature is between about 70° C. and 125° C.

4. The rubber composition of claim 1, wherein the thermal transition temperature is a glass transition temperature of the microencapsulation material.

5. The rubber composition of claim 1, wherein the one or more ultra-accelerators are selected from the group consisting of xanthates, dithiocarbamates, thiurams, dithiophosphates and mixtures thereof.

6. The rubber composition of claim 1, further comprising:
   one or more non-ultra-accelerator curing agents for rubber.

7. The rubber composition of claim 6, wherein the non-ultra-accelerators are selected from the group consisting of thiazoles, sulphenamides, guanidines, thiourea derivatives, amine derivatives and combination thereof.

8. The rubber composition of claim 6, wherein a mixture of non-ultra-accelerator and and ultra-accelerator curing agents is present in an amount from more than 0 to about 5 phr by weight of rubber.

9. The rubber composition of claim 1, wherein the difference less than a +5 percent change in the $t_0$ measurement of the unaged rubber composition.

10. The rubber composition of claim 1, wherein the difference is less than a −5 percent change in the $t_0$ measurement of the unaged rubber composition.

11. The rubber composition of claim 1, wherein the rubber is selected from the group of highly unsaturated diene elastomers consisting of natural rubber, polybutadienes, polyisoprenes and combinations thereof.

12. A tire comprising the rubber composition of claim 1, wherein the rubber composition is in a cured state.

13. A method of retreading tires, comprising:
applying the rubber composition of claim 1 to a tire carcass, a tire tread or combinations thereof; and
curing the rubber composition to bond the tire tread to the carcass.

14. A method of repairing a tire, including a defect, comprising:
applying the rubber composition of claim 1 to a defect in the tire.

15. The rubber composition of claim 1, wherein between about 20 and 60% of the sulfur by weight is encapsulated.

16. The rubber composition of claim 1, wherein between about 40 and 60% of the sulfur by weight is encapsulated.

17. The rubber composition of claim 1, wherein between about 60 and 95% of the sulfur by weight is encapsulated.

18. An uncured dienie rubber composition, comprising:
a dienic rubber;
one or more ultra-accelerator rubber curing agents; and
microencapsulated sulfur and free sulfur, the microencapsulated sulfur being microencapsulated in a material having a thermal transition temperature between a processing temperature and a curing temperature of the rubber composition, wherein a difference between $t_{90}$ measurements taken isothermally at 125° C. in accordance with ASTM D2084 of a 6 mm thick sample of the rubber composition aged for 28 days at 40° C. and of the rubber composition unaged, is less than a +10 percent change in the $t_0$ measurement of the unaged rubber composition, wherein the percent change is detennined by the equation $[t_{90\ (aged)} - t_{90\ (unaged)}] * 100 / t_{90\ (unaged)}$.

19. The rubber composition of claim 18, wherein the difference is less than a +5 percent change in the $t_{90}$ measurement of the unaged rubber composition.

20. The rubber composition of claim 18, wherein the difference is less than a -5 percent change in the $t_{90}$ measurement of the unaged rubber composition.

* * * * *